(12) United States Patent
Frommelt et al.

(10) Patent No.: US 11,528,583 B2
(45) Date of Patent: Dec. 13, 2022

(54) DEVICE, METHOD AND SYSTEM FOR DETERMINING A PRIMARY LOCATION OF A PUBLIC-SAFETY UNIT

(71) Applicant: MOTOROLA SOLUTIONS, INC., Chicago, IL (US)

(72) Inventors: Brian J. Frommelt, Chicago, IL (US); Nadeem Z. Kureishy, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 156 days.

(21) Appl. No.: 17/114,648

(22) Filed: Dec. 8, 2020

(65) Prior Publication Data

US 2022/0182787 A1 Jun. 9, 2022

(51) Int. Cl.
*H04W 4/029* (2018.01)
*G08G 1/13* (2006.01)

(52) U.S. Cl.
CPC ............. *H04W 4/029* (2018.02); *G08G 1/13* (2013.01)

(58) Field of Classification Search
CPC ................................ H04W 4/029; G08G 1/13
USPC ....................................................... 455/456.1
See application file for complete search history.

(56) References Cited

U.S. PATENT DOCUMENTS

| 8,121,615 B2 | 2/2012 | Carpio et al. | |
| 8,903,657 B2 | 12/2014 | Bekiares et al. | |
| 9,980,094 B2 | 5/2018 | Dupuy et al. | |
| 2009/0079622 A1 | 3/2009 | Seshadri et al. | |
| 2010/0317317 A1* | 12/2010 | Maier | H04W 4/029 455/404.2 |
| 2013/0045759 A1 | 2/2013 | Smith | |
| 2013/0244714 A1 | 9/2013 | Klein et al. | |
| 2015/0281884 A1 | 10/2015 | Smith et al. | |
| 2016/0080888 A1 | 3/2016 | Kreitzer et al. | |
| 2018/0184236 A1* | 6/2018 | Faraone | H04W 4/027 |

FOREIGN PATENT DOCUMENTS

CA 2773749 C 10/2018

* cited by examiner

*Primary Examiner* — Ted M Wang
(74) *Attorney, Agent, or Firm* — Perry + Currier, Inc.

(57) ABSTRACT

A device, method and system for determining a primary location of a public-safety unit is provided. An example device receives, from a plurality of devices associated with a public-safety unit, a plurality of locations associated with the public-safety unit, the public-safety unit comprising the plurality of devices and one or more public-safety personnel. The example device determines a context associated with the public-safety unit. The example device selects a single location, from the plurality of locations, that represents a primary location of the public-safety unit based on the context as determined. The example device one or more of: causes the primary location to be provided at an electronic map; and provides the primary location to one or more of a computer-aided dispatch (CAD) device and a public-safety server.

20 Claims, 6 Drawing Sheets

DEVICE, METHOD AND SYSTEM FOR DETERMINING A PRIMARY LOCATION OF A PUBLIC-SAFETY UNIT

BACKGROUND OF THE INVENTION

Having accurate and timely location information for first responders and/or public-safety personnel may be critical to incident response and responder safety. However, a single public-safety unit can have multiple sources of location information.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
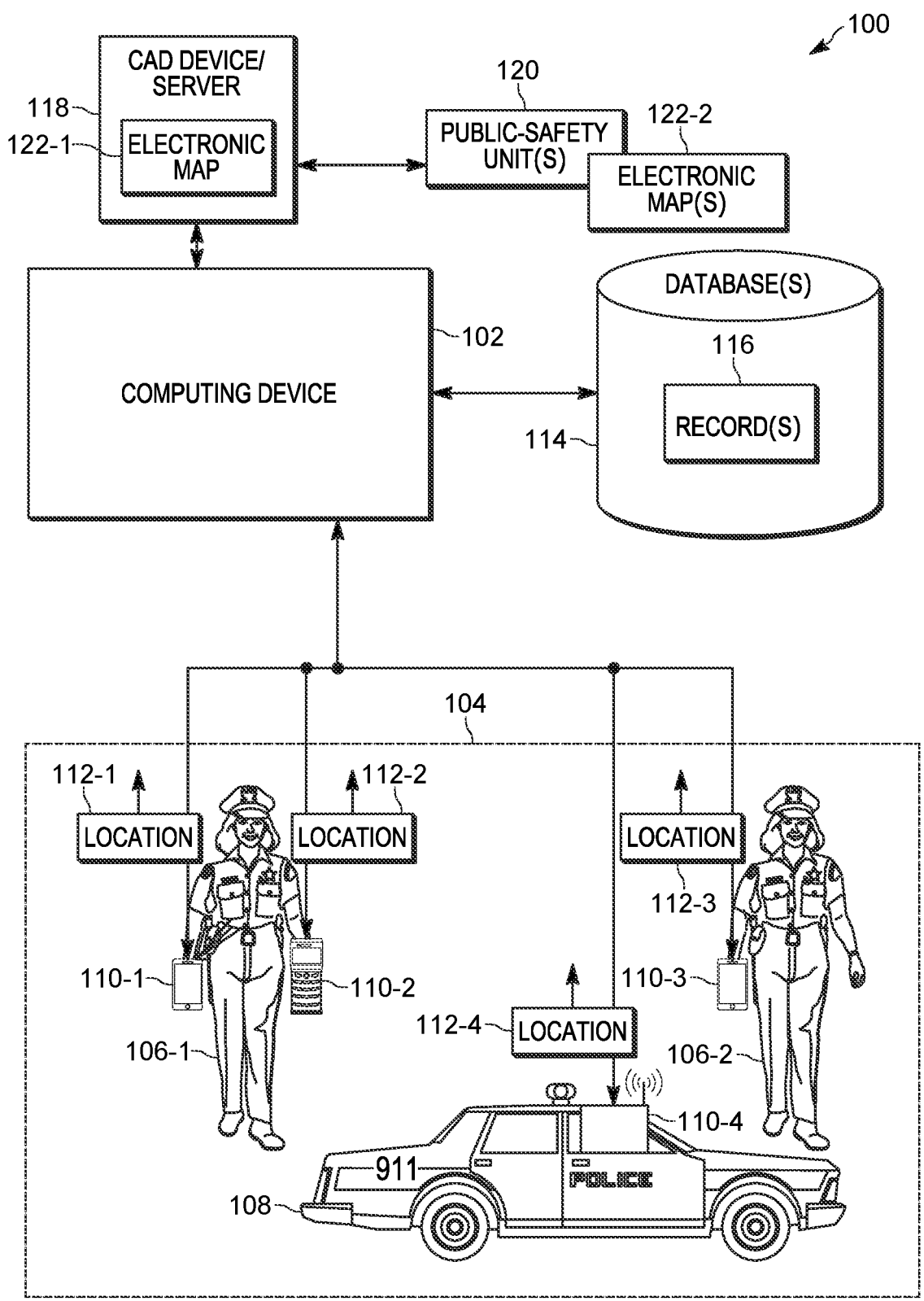
FIG. 1 is a system for determining a primary location of a public-safety unit, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Having accurate and timely location information for first responders and/or public-safety personnel may be critical to incident response and responder safety. However, a single public-safety unit can have multiple sources of location information. Hereafter, first responders and/or public-safety personnel will be interchangeably referred to as responders and/or as a responder.

For example, a public-safety unit may be understood to comprise a dispatchable entity (e.g., dispatchable to an incident) made up of one or more responders (e.g., police officers, fire fighters, emergency medical technicians (EMTs), and the like), one or more communication devices and/or mobile devices, and optionally a vehicle (e.g., such as a police car, fire truck, an ambulance, a drone and the like). In particular, communication devices, and/or other devices, associated with a public-safety unit may report and/or transmit their respective locations to a central computing device (e.g., a public-safety server and/or cloud computing device), which leads to the public-safety unit being associated with a plurality of locations associated with the public-safety unit. For example, responders of the public-safety unit may each carry a radio and a mobile phone, which may both report respective locations, and possibly additional devices that may report respective locations (e.g., such as a body worn camera (BWC)); similarly, a vehicle of the public-safety unit may include a modem, a "dash cam", a mobile data terminal (MDT), and/or a telematics device, etc., that all may report respective locations; similarly, a drone of the public-safety unit may report a respective location.

As such, a plurality of locations may be associated with the public-safety unit, and which may differ from each other, for example when responders of the public-safety unit leave the vehicle, for example to pursue a suspect and/or investigate an incident. However, the plurality of locations may differ even when the responders and/or a vehicle of the unit are co-located, as the various devices of the unit may have different location determining capabilities, for example of varying accuracies and/or cadences. The plurality of locations may be reported to the central computing device, which may cause the plurality of locations to be rendered at an electronic map, for example provided by displays screens of a dispatcher and/or further public-safety units; however, as the plurality of locations may differ, the electronic map may show the plurality of locations scattered over a large area, leading to ambiguity about the location of the public-safety unit. In some instances, the central computing device, and the like, may always prioritize one location, of the plurality of locations, from a specific device, which is then shown at the electronic map, but may not be the most accurate of the locations. As the location of the public-safety unit may be critical when dispatching further public-safety units to an incident, and the like, there exists a need for an improved technical method, device, and system for determining a primary location of a public-safety unit.

As such, provided herein is a computing device, which receives a plurality of locations associated with a public-safety unit and further has access to information defining context associated with the public-safety unit, such as a current incident to which the public-safety unit is dispatched, an incident type, a geographic area and/or address of the current incident, a computer-aided dispatch (CAD) status associated with the public-safety unit, telemetry data of a vehicle of the public-safety unit, and the like. From the context, the computing device may select a single location, from the plurality of locations, that represents a primary location of the public-safety unit and cause the primary location to be provided at an electronic map and/or provide the primary location to a CAD device, and the like. Regardless, the primary location is selected to represent a "best" location of the public-safety unit, which may be used to dispatch further public-safety units to assist with the current incident and the like.

An aspect of the present specification provides a method comprising: receiving, at a computing device, from a plurality of devices associated with a public-safety unit, a plurality of locations associated with the public-safety unit, the public-safety unit comprising the plurality of devices and one or more public-safety personnel; determining, at the computing device, a context associated with the public-safety unit; selecting, at the computing device, a single location, from the plurality of locations, that represents a primary location of the public-safety unit based on the context as determined; and, one or more of: causing, via the computing device, the primary location to be provided at an electronic map; and providing, from the computing device, the primary location to one or more of a computer-aided dispatch (CAD) device and a public-safety server.

Another aspect of the present specification provides a device comprising: a communication unit; and a controller communicatively coupled to the communication unit, the controller configured to: receive, via the communication unit, from a plurality of devices associated with a public-safety unit, a plurality of locations associated with the public-safety unit, the public-safety unit comprising the plurality of devices and one or more public-safety personnel; determine a context associated with the public-safety unit; select a single location, from the plurality of locations, that represents a primary location of the public-safety unit based on the context as determined; and, one or more of: cause the primary location to be provided at an electronic map; and provide, via the communication unit, the primary location to one or more of a computer-aided dispatch (CAD) device and a public-safety server.

Each of the above-mentioned examples will be discussed in more detail below, starting with example system and device architectures of the system in which the embodiments may be practiced, followed by an illustration of processing blocks for achieving an improved technical method, device, and system for determining a primary location of a public-safety unit based on context.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for determining a primary location of a public-safety unit. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises a computing device 102, which is in communication with devices of a public-safety unit 104. For example, as depicted the public-safety unit 104 comprises two public-safety personnel, referred to hereafter as first responders 106-1, 106-2, and a vehicle 108. In addition, the public-safety unit 104 comprises a plurality of devices 110-1, 110-2, 110-3, 110-4, which comprise any suitable respective location determining devices, which report and/or transmit respective locations 112-1, 112-2, 112-3, 112-4 to the computing device 102. While not depicted, the public-safety unit 104 may comprise other devices, including, but not limited to one or more drones, and the like, which may also report and/or transmit respective locations to the computing device 102.

The first responders 106-1, 106-2 are interchangeably referred to hereafter, collectively, as the responders 106, and, generically, as a responder 106. This convention will be used throughout the present specification. For example, the plurality of devices 110-1, 110-2, 110-3, 110-4 are interchangeably referred to hereafter as the devices 110, and/or a device 110; similarly the plurality of locations 112-1, 112-2, 112-3, 112-4 are interchangeably referred to hereafter as the locations 112, and/or a location 112.

While the public-safety unit 104 is depicted with two responders 106, a vehicle 108 and four devices 110, in present examples the public-safety unit 104 may comprise as few as one responder 106 and two devices 110, and the vehicle 108 may be optional.

Furthermore, while the responders 106 are depicted as police officers, the responders 106 may comprise any suitable first responders, and the like, including, but not limited to, firefighters, EMTs, and the like. However, the responders 106 may alternatively comprise employees of a business, and the like, which provide public-safety related services; hence, the responders 106 may comprise security guards, and the like, dispatchable to an incident at a private property, and the like, monitored by the business. Similarly, the responders 106 may alternatively comprise military personnel, and the like.

Similarly, while the optional vehicle 108 is depicted as a police car, the vehicle 108 may comprise any suitable vehicle including, but not limited to, a fire truck, an ambulance, a security vehicle, and the like.

Furthermore, while not depicted, the public-safety unit 104 may comprise other types of devices, including, but not limited to, body-worn cameras, dash cams (e.g. and/or other camera-sensor devices), holster status and/or weapon-drawn devices, (e.g., which may determine whether, or not a weapon is drawn, or not, from a holster), vest-pierce detectors, gun-shot detectors, man-down devices, heart-rate monitors, and/or other sensors, which may include respective sensors and/or report respective sensor data to the computing device 102, such sensor data indicating a status (e.g., context, which may additionally include a location 112) of the responders 106 and/or the vehicle 108, and hence a context of the public-safety unit 104. Such devices may alternatively determine, and report, event data, such as a weapon withdrawn event, a vest-pierced event, a gun-fired event, a man-down event, a high heart rate event (e.g., heart rate being above a threshold heart rate and/or safety heart-rate (e.g., a dangerous heart rate)), and the like. Such detection of an event may, in some examples, be based on images from camera-sensor devices of the public-safety unit 104.

Such sensor data may be transmitted to the computing device 102 via one or more of the devices 110 (e.g., which may form one or more personal area networks with one or more sensors, and the like, and act as a hub for one or more personal area networks).

Regardless, it is understood that the computing device 102 receives, from the plurality of devices 110 associated with the public-safety unit 104, a plurality of locations 112 associated with the public-safety unit 104, the public-safety unit 104 comprising the plurality of devices 110 and one or more public-safety personnel (e.g., the responders 106).

While the responders 106 are depicted outside the vehicle 108, one or more of the responders 106 may be inside the vehicle 108. The responders 106 may leave the vehicle 108 to, for example, chase a suspect, investigate an incident, and the like.

As such, the locations 112 may indicate different locations, for example corresponding to different locations of the responders 106 and the vehicle 108. Furthermore, the locations 112 may be in any suitable format, including, but not limited to, Global Positioning System (GPS) coordinates, geographic and/or civic addresses, map coordinates, and the like. When the locations 112 are in different formats, the computing device 102 may convert the locations 112 to a common format (e.g., compatible with electronic maps, described in more detail below).

However, even with the responders 106 and the vehicle 108 are co-located, and/or the devices 110 (and/or subsets thereof) are co-located, the locations 112 may be different.

For example, as depicted the devices 110-1, 110-3 may each comprise cell phones, and the like, the device 110-2 may comprise a land-mobile radio (LMR) that primarily communicates via talk-groups and/or communication channels, and the device 110-4 may comprise an MDT device, and the like. Furthermore, while four devices 110 are depicted, of three different types, the public-safety unit 104 may comprise other numbers of devices 110 (e.g., at least two devices 110, which may be less than four devices 110 or more than four devices 110), of same or other types, including, but not limited to, BWCs, vehicle modems, dash cams, telematics devices (e.g., which determine physical status of the vehicle such as doors being open or closed, seats being occupied or not, and the like). Regardless, the devices 110 may include same or different types of respective location determining devices, which may determine location in same or different ways, according to different accuracies (e.g., vertical and/or horizontal accuracies) and/or same or different cadences and the like.

For example, one or more of the devices 110 may comprise a GPS device, which determines, and reports to the computing device 102, a GPS location every second, while another one or more of the devices 110 may comprise an assisted GPS device, which determines, and reports to the computing device 102, an assisted GPS location every ten seconds. In particular, an assisted GPS device is understood to include a device, which reports, to a service (e.g., GPS assisted device in the cloud, which may include the computing device 102), identifiers of WiFi Access points, cell towers, and the like, with which a device 110, that includes the assisted GPS device, is in communication, and the service may respond with an assisted GPS location; such an assisted GPS device may comprise a type of triangulation location determination device. However, an assisted GPS location and/or triangulation location, may be less accurate than a GPS location. It is understood that accuracy of a location may comprise an error of a location 112 (e.g., a given location 112 may be accurate to +/−a given number of meters, horizontally and/or vertically and the like).

Similarly, different devices 110 may report and/or transmit respective locations 112 at different cadences, which may be understood to include a rate at which locations 112 are reported and/or transmitted to the computing device 102 and/or a rate at which an associated location determining device determines a location 112. Cadence may alternatively be referred to as cadence location reporting.

Hence, even when the devices 110 are co-located, the locations 112 may differ due to cadence. For example, a first device 110, which reports a first location 112 to the computing device 102 each second may provide a more correct indication of a current location 112 of the public-safety unit 104 as compared to a second device 110, which reports a second location 112 to the computing device 102 every five minutes, even when an accuracy of the second location 112 is better than the accuracy of the first location 112.

Hence, in some examples a location determining device of one device 110 may have higher accuracy, but lower cadence as compared to another location determining device, of another device 110, having lower accuracy and higher cadence.

Hence, even when the devices 110 are co-located, the locations 112 may differ due to accuracy and/or cadence of respective location determining devices.

As such, the computing device 102 is further configured to determine a context associated with the public-safety unit 104, which may be used to select a primary location 112 of the public-safety unit 104, as described herein. Such context may be determined in any suitable manner.

In some examples, the context may be determined based on a current incident to which the public-safety unit 104 has been assigned or dispatched and/or related information. For example, as depicted, the computing device 102 may have access to a memory 114, depicted in the form of a database (though the memory 114 may be in any suitable format), storing records 116, such as CAD records, which may include, but is not limited to, an incident record of a current incident to which the public-safety unit 104, which may further include an incident type of the current incident (e.g., a domestic disturbance, robbery, a murder, etc.), an address and/or geographic area (e.g., a neighborhood, and the like) of the current incident, and the like. The records 116 may further include, but are not limited to, records indicating a respective CAD status of one or more of: the public-safety unit 104, the one or more public-safety personnel (e.g., the responders 106) of the public-safety unit 104; and the vehicle 108 of the public-safety unit 104.

Such a CAD status may indicate whether the public-safety unit 104 and/or a given responder 106 is dispatched or not dispatched to an incident (e.g., "en-route" to an incident, "on-scene" at the incident, or "on-patrol" and not dispatched to an incident). Such a CAD status may be reported to the computing device 102 and/or a CAD device (e.g., described below) by a responder 106, using a respective device 110, via audio or video data (e.g., audio from a responder 106 saying "We have arrived on scene"), which may cause a record 116 to be updated accordingly.

Such a CAD status may similarly indicate whether a given responder 106 is in or out of the vehicle 108 (e.g., as reported via audio or video data and/or telemetry data from one or more of the devices 110), whether or not a weapon has been drawn, whether or not one or more of the responders 106 is "down", whether or not a responder 106 has indicated an emergency situation, and the like.

The records 116 may further include, but are not limited to, other types of data, such as records of geographic areas considered "dangerous" and/or previous incident reports associated with the public-safety unit 104, or further public-safety units. The records 116 may further include, but are not limited to, records of a Premise Hazard Service (PHZ), which stores given locations/addresses known to be dangerous, such as a fireworks factory and the like, amongst other possibilities. The records 116 may further include, premise history records storing addresses associated with past incidents and/or known suspects, including, but not limited to, known addresses of dangerous suspects having, or suspected to have, unlicensed weapons and/the like, addresses with frequent noise complaints, frequent domestic disputes, addresses where accidents occurs, addresses where items were stolen and the like (e.g. and which may also indicate whether a resident of an address is cooperative or not), among other possibilities.

The records 116 may further store respective associations between the plurality of devices 110 and the one or more public-safety personnel (e.g., the responders 106), which may be used to determine context (e.g., which device 110 is assigned to which responder 106).

Similarly, the records 116 may further store a type of the devices 110 and/or types of respective location determining devices of the devices 110, and/or accuracies and/or cadences of the locations 112 determined by the respective location determining devices of the devices 110.

In some examples, the computing device 102 may determine context based on sensor data and/or event data received from one or more of the devices 110 and/or other devices associated with the public-safety unit 104 (e.g., sensor devices, including, but not limited to a holster-device, a man-down device, and the like, as previously described). Additionally or alternatively, the computing device 102 may determine context based on telemetry data of the vehicle 108.

The computing device 102 may select a single location 112, from the plurality of locations 112, that represents a primary location 112 of the public-safety unit 104 based on the context as determined.

In a simple example, the context may indicate that the responders 106 are all in the vehicle 108, which is moving. The computing device 102 may select a single location 112, from the plurality of locations 112, based on this context, such as a most accurate location 112 and/or a most recent location of the plurality of locations 112.

Alternatively, the context may indicate that the public-safety unit 104 has been dispatched to a robbery at a mall, and the like, and further indicate that the vehicle 108 is stopped adjacent the mall, and the responders 106 are moving outside the vehicle 108. The computing device 102 may select a single location 112, from the plurality of locations 112, based on this context, such as a location 112 of a fastest moving responder 106, or a location 112 of a responder 106 that has drawn a weapon.

However, a primary location 112 may be selected on the basis of both context and one or more accuracy and/or cadence of the locations 112 and/or a types of location-determining devices that determined respective locations at the plurality of devices 110.

For example, when a fastest-moving responder 106, and/or a responder 106 that has drawn a weapon, and the like, is associated with more than one device 110, such as the responder 106-1 associated with the devices 110-1, 110-2, the computing device 102 may select a location 112 based on context associated with one of the devices 110-1, 110-2, such as one of the locations 112-1, 112-2. In one example, the computing device 102 may select, from the locations 112-1, 112-2, a most accurate location 112, and/or a location 112 being reported with the highest cadence, amongst other possibilities. In this example, a location 112 being reported with the highest cadence may be selected as the primary location 112 over a most accurate location 112 when the cadence of a device 110 reporting the most accurate location 112 is above a given threshold (e.g., a location reported every minute), and the associated responder 106 is moving, as the most accurate location 112 may not best represent a current location of the associated responder 106.

Hence, in some examples, a primary location 112 may comprise a respective location 112 of a particular responder 106 that is most in need of assistance.

However, the records 116 may indicate that a location-determining device of one of the devices 110 is a GPS device, while a location-determining device of another of the devices 110 is an assisted GPS device; in this example, a location 112 being reported by a GPS device may be selected as the primary location 112 over a location 112 being reported by an assisted GPS device, which may be less accurate (or vice versa).

Further examples of context are described in more detail below.

The computing device 102, having selected a primary location 112 of the public-safety unit 104, may cause the primary location 112 to be provided at an electronic map and/or provide the primary location 112 to one or more of a CAD device and a public-safety server. For example, as depicted, the system 100 further comprises a CAD device 118 (and/or a CAD server and/or a public-safety server) in communication with the computing device 102. The CAD device 118 may comprise a dispatch terminal and/or a CAD server and/or a public-safety server, and the like, operated by a public-safety entity, such as a police force, a fire department, an EMT department, and/or security company and the like, tasked with dispatching public-safety units to incidents and/or tracking locations of public-safety units and the like. While the CAD device 118 is depicted as combined with a server, in other examples, the CAD device 118 may comprise a dispatch terminal distinct from a CAD server and/or a public-safety server, and the CAD device 118 may be in communication with the computing device 102 via such a CAD server and/or public-safety server. In other examples, the computing device 102 may comprise such a CAD server and/or public-safety server, which performs more general CAD functionality, in addition to determining a primary location of a public-safety unit, as described herein.

As depicted, the system 100 may comprise one or more further public-safety units 120, which may be similar to the public-safety unit 104 (e.g., but which may comprise as few as one responder, similar to, or different from, the responders 106, and as few as one device, similar to, or different from, one or more of the devices 110). The CAD device 118 may generally dispatch one or more of the public-safety units 104, 120 to incidents and/or track locations the public-safety units 104, 120 and/or provide information to the public-safety units 104, 120 as indicating locations of the public-safety units 104, 120.

For example, as depicted, the CAD device 118 and/or one or more of the further public-safety units 120 (e.g., devices thereof) may generate and/or maintain respective electronic maps 122-1, 122-2 (e.g., electronic maps 122 and/or an electronic map 122) at which locations of the public-safety units 104, 120 may be indicated, including, but not limited, a primary location 112 of the public-safety unit 104 determined from a context of the public-safety unit 104.

For example, once the computing device 102 selects a primary location 112 of the public-safety unit 104 based on a context of the public-safety unit 104, the computing device 102 may transmit the primary location 112 of the public-safety unit 104 to the CAD device 118, which may render the primary location 112 at the electronic map 122-1 so that a dispatcher operating the CAD device 118 may view the primary location 112 at the electronic map 122-1. Alternatively, the computing device 102, and/or the CAD device 118, may transmit the primary location 112 to a suitable device of one or more of the further public-safety units 120 (e.g., a device that includes a display screen), which may render the primary location 112 at a respective electronic map 122-2, so that a respective responder of a further public-safety unit 120 may view the primary location 112 at the respective electronic map 122-2.

As such, viewers of the electronic maps 122 will understand a "best" location 112 and/or a primary location 112 of the public-safety unit 104. For example, when a further public-safety unit 120 is dispatched to assist the public-safety unit 104, the further public-safety unit 120 may be dispatched to the primary location 112, which may be a location where a particular responder 106 is most in need of assistance.

Hence, while the further public-safety units 120 are depicted as being in communication with the CAD device 118, but not the computing device 102, it is understood that the further public-safety units 120 may be in communication with depicted as being in communication with the computing device 102 and/or the CAD device 118.

Alternatively, the computing device 102 may generate an electronic map 122 with the primary location 112 rendered at the electronic map 122 and transmit such an electronic map 122 to the CAD device 118 and/or a further public-safety unit 120.

In some examples, the primary location 112 may be provided to the CAD device 118 (and/or a further public-safety unit 120) without rendering at an electronic map 122, for example, in the form of a civic address, and the like, and/or in any other suitable format.

The computing device 102 may alternatively also provide the other locations 112 (e.g., the locations 112 not selected as the primary location 112) to the CAD device 118 and/or one or more of the further public-safety units 120. The other locations 112 (e.g., which may alternatively be referred to as secondary locations 112) may, or may not, be rendered at an electronic map 122. In some of these examples, the primary location 112 may be rendered at an electronic map 122 with selectable electronic options associated with one or more of the other/secondary locations 112 such that, in response to a given electronic option being selected via an input device, an associated other/secondary location 112 is rendered at an electronic map 122 with the primary location 112. Such an alternative example will be described in more detail below with respect to FIG. 5 and FIG. 6.

However, the other/secondary locations 112 may be rendered at an electronic map 122 in a different format than the primary location 112. For example, the locations 112 may be rendered as respective icons and/or dots, with an icon and/or dot representing the primary location 112 being larger than, or different from, respective icons and/or dots of the other/secondary locations 112. Ghosting and/or labels and/or graphics (and/or any other suitable visual differentiator) of the icons and/or dots may also be used to distinguish icons and/or dots of the primary location 112 from the icons and/or dots of the secondary locations 112.

Figure 2:
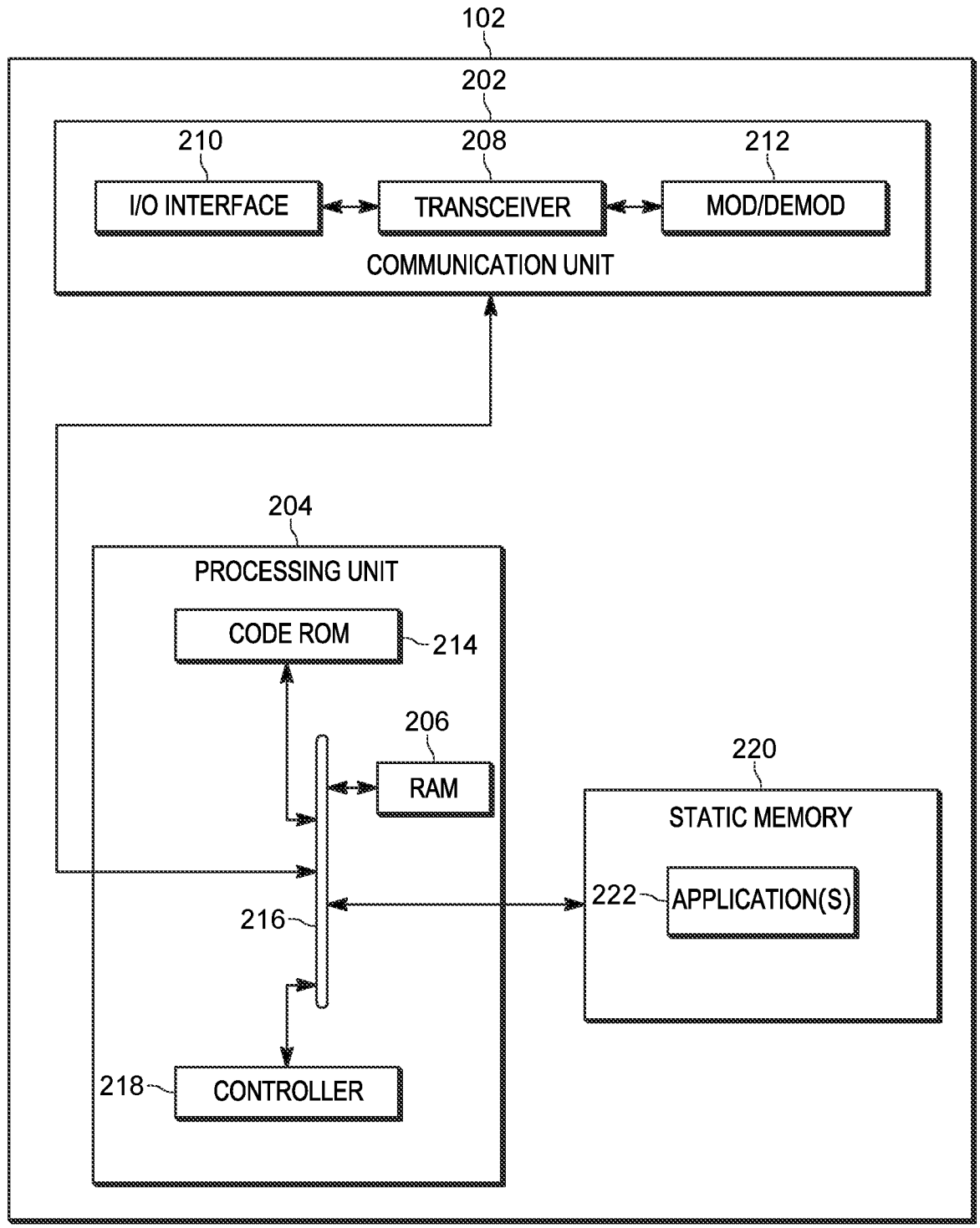
FIG. 2 is a device diagram showing a device structure of a device for determining a primary location of a public-safety unit, in accordance with some examples.

Attention is next directed to FIG. 2, which depicts a schematic block diagram of an example of the computing device 102. In general, the computing device 102 may comprise one or more servers and/or one or more cloud computing devices in communication with the devices 110, the CAD device 118 and/or devices of one or more of the further public-safety units 120. The computing device 102 may further be in communication with the memory 114, which may be local or remote from the computing device 102, and in communication therewith via any suitable combination of wired and/or wireless communication links and/or the computing device 102 may comprise the memory 114 and/or the records 116 and/or a portion of the records 116.

As depicted, the computing device 102 comprises: a communication unit 202, a processing unit 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration.

While not depicted, the computing device 102 may include one or more of an input device and a display screen and the like.

As shown in FIG. 2, the computing device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for determining a primary location of a public-safety unit. For example, in some examples, the computing device 102 and/or the controller 218 specifically comprises a computer executable engine configured to implement functionality for determining a primary location of a public-safety unit.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the computing device 102 as described herein are maintained, persistently, at the memory 220 and used by the controller 218, which makes appropriate utilization of volatile storage during the execution of such programming instructions.

Figure 3:
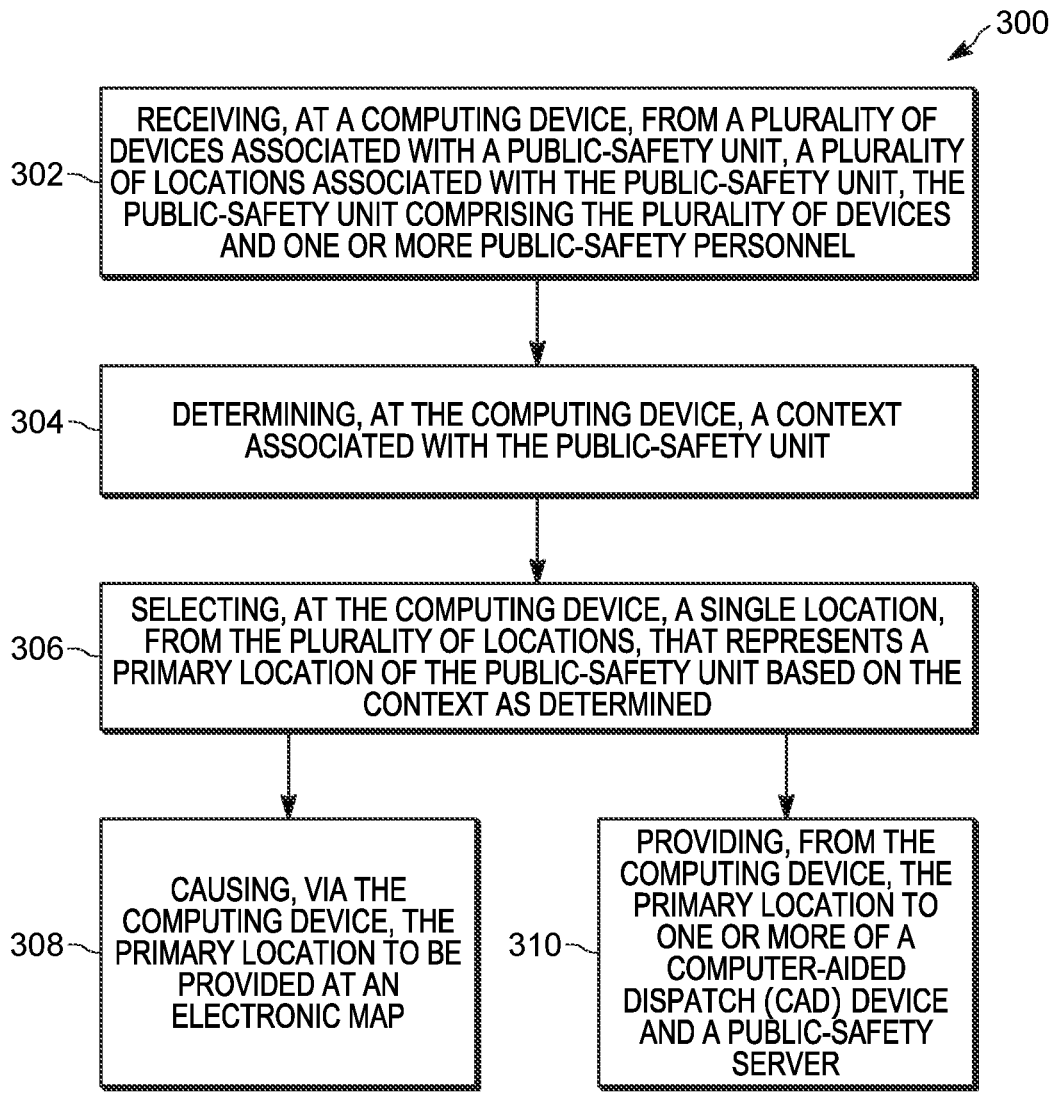
FIG. 3 is a flowchart of a method for determining a primary location of a public-safety unit, in accordance with some examples.

In particular, the memory 220 stores instructions corresponding to the at least one application 222 that, when executed by the controller 218, enables the controller 218 to implement functionality for determining a primary location of a public-safety unit, including but not limited to, the blocks of the methods set forth in FIG. 3.

In illustrated examples, when the controller 218 executes the one or more applications 222, the controller 218 is enabled to: receive, from a plurality of devices associated with a public-safety unit, a plurality of locations associated with the public-safety unit, the public-safety unit comprising the plurality of devices and one or more public-safety personnel; determine a context associated with the public-safety unit; select a single location, from the plurality of locations, that represents a primary location of the public-safety unit based on the context as determined; and, one or more of: cause the primary location to be provided at an electronic map; and provide the primary location, to one or more of a CAD) device and a public-safety server.

The application 222 may include programmatic algorithms, and the like, to implement functionality as described herein, which may include, but is not limited to, one or more programmatic algorithms.

Alternatively, and/or in addition to programmatic algorithms, the application 222 may include one or more machine learning algorithms to implement functionality as described herein, and which may include, but is not limited to, a machine learning algorithm. The one or more machine learning models and/or algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. Any suitable machine learning algorithm and/or deep learning algorithm and/or neural network is within the scope of present examples.

In examples where the application 222 includes one or more machine learning algorithms, the computing device 102 may be operated in a learning mode to "teach" the one or more machine learning algorithms to select a primary location based on context, for example by providing manually selected (e.g. by CAD operators and/or other users) primary locations and associated contexts to the computing device 102 in the learning mode. For example, machine learning classifiers may be generated in the learning mode and used to select a primary location based on context during operation of the computing device 102 outside the learning mode.

While the components of the devices 110, the CAD device 118, and devices of the one or more further public-safety units 120 are not depicted, it is understood that components of such devices may be similar to the components of the computing device 102, but adapted for respective functionality thereof as described herein. In particular, the devices 110 are understood to include location determining devices as described above. Similarly, the CAD device 118, and the devices of the one or more further public-safety units 120, may include respective display screens to render the electronic maps 122.

Attention is now directed to FIG. 3, which depicts a flowchart representative of a process 300 for determining a primary location of a public-safety unit. The operations of the process 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The process 300 of FIG. 3 is one way in which the controller 218 and/or the computing device 102 and/or the system 100 may be configured. Furthermore, the following discussion of the process 300 of FIG. 3 will lead to a further understanding of the system 100, and its various components.

The process 300 of FIG. 3 need not be performed in the exact sequence as shown and likewise various blocks may be performed in parallel rather than in sequence. Accordingly, as previously mentioned, the elements of process 300 are referred to herein as "blocks" rather than "steps." The process 300 of FIG. 3 may be implemented on variations of the system 100 of FIG. 1, as well.

At a block 302, the controller 218 and/or the computing device 102 receives from a plurality of devices 110 associated with a public-safety unit 104, a plurality of locations 112 associated with the public-safety unit 104, the public-safety unit 104 comprising the plurality of devices 110 and one or more public-safety personnel (e.g., the responders 106). Such receipt of the locations 112 has been described above and may include, but is not limited to, the devices 110 reporting respective locations 112 to the computing device 102 according to respective cadences and/or upon request form the computing device 102.

At a block 304, the controller 218 and/or the computing device 102 determines a context associated with the public-safety unit 104.

The contexts determined at the block 304 may be determined from one or more of the following, as well as how such contexts may affect later selection of a primary location 112 (e.g. selected at the block 306 described below):

A current incident to which the public-safety unit 104 is assigned and/or dispatched. For example, a record 116 may comprise a record of the current incident, which may include, but is not limited to, an incident type of the current incident, a respective geographic area of the current incident, a respective address of the current incident, among other possibilities. The context may hence be determined from one or more of a respective geographic area of the current incident, and a respective address of the current incident, among other possibilities.

For example, one context may comprise an incident type of the current incident, such as a noise complaint, serving a warrant, a domestic disturbance, a robbery, a murder, among other possibilities, which may be classified and/or ranked according to type and/or danger level; for example, a noise complaint being less dangerous than a domestic disturbance, which may be less dangerous than serving a warrant, etc. In some examples, when context indicates that the incident type is more dangerous, a more accurate location 112 may be selected as the primary location 112, for example as accurate dispatch of other public-safety units 120 to a more dangerous incident may be important. For a less dangerous incident type, the location of the higher ranked responder 106 may be selected as the primary location 112.

Another context may comprise a geographic area of the current incident and/or an associated crime rate, and/or whether or not the area is classified as a high crime area or a low crime area, and the like. For example, a first geographic area of the current incident may be associated with relatively high crime statistics and classified as a high crime area, while a second geographic area may be associated with relatively low crime statistics and classified as a low crime area. In some examples, when context indicates that the current incident is in a high crime area, a more accurate location 112 may be selected as the primary location 112, for example as accurate dispatch of other public-safety units 120 to a high crime area may be important. For a low crime area, the location of the higher ranked responder 106 may be selected as the primary location 112. In yet further examples, when the locations 112 are in different areas, which may occur when the responders 106 split up, a location 112 in the higher crime area may be selected as the primary location 112 over a location 112 in a lower crime area.

Whether a geographic area is classified as a high crime area or a low crime area, or another "level" of crime area, may be threshold-based. For example, a crime rate of a geographic area may be compared to a threshold crime rate; when a crime rate of the geographic area is above the threshold crime rate, the geographic area may comprise a high crime area, and when the crime rate of the geographic area is below the threshold crime rate, the geographic area may comprise a low crime area.

However, the geographic area may be classified as a high crime area or a low crime area based on types of crimes in the area. For example, a first geographic area with a murder rate above a threshold murder rate may be classified as a high crime area, but a second geographic area with a noise complaint rate above a threshold noise complaint rate may not be classified as a high crime area.

Another context may comprise a geographic area of the current incident being classified as dangerous, or not, based on records (e.g., which may include, but are not limited to, the PHZ records). In some examples, when context indicates that the current incident is in a dangerous, a more accurate location 112 may be selected as the primary location 112, for example as accurate dispatch of other public-safety units 120 to a more dangerous area may be important. For a less dangerous (and/or not dangerous), the location of the higher ranked responder 106 may be selected as the primary location 112.

Another context may comprise an address of the current incident comprising an address associated with past incidents and/or known suspects based on records (e.g., which may include, but are not limited to, premise history records). In some examples, when context indicates that a dangerous suspect may be at the address of the current incident, a more accurate location 112 may be selected as the primary location 112, for example as accurate dispatch of other public-safety units 120 to a dangerous address may be important. For a less dangerous (and/or not dangerous) address, the location of the higher ranked responder 106 may be selected as the primary location 112.

Another context may comprise network coverage (e.g., wireless network coverage) of a geographic area of the current incident, and/or a geographic area where the public-safety unit is currently located, as determined from network parameters that may include, but is not limited to, bandwidth available a geographic area, a percentage, and the like, of the geographic area where a wireless network is available, and the like, GPS satellite coverage, and the like. Such network coverage may be different for devices 110 of different types. For example, an LMR device and/or a vehicle device, such as the devices 110-2, 110-4 may communicate via a narrowband wireless network, while cell phones, such as the devices 110-1, 110-3 may communicate via a broadband wireless network. Such coverage may be retrieved from associated network devices (not depicted) and/or the records 116 and/or may be reported by the devices 110. Similarly, location determining network coverage may be different for different location determining devices; for example, GPS satellite coverage in a geographic area, for a GPS device, may be higher or lower than assisted GPS coverage in the geographic area for an assisted GPS device. Hence, in these examples, a location 112 provided by a device 110 having the best relative associated network coverage, and the like, may be selected as the primary location 112.

> A respective CAD status of one or more of: the public-safety unit 104; the one or more public-safety personnel (e.g., the responders 106) of the public-safety unit 104; and the vehicle 108 of the public-safety unit 104. Hence, one or more contexts may comprise one or more of such CAD statuses.

For example, a context may comprise a CAD status of the public-safety unit 104 indicating whether or not the public-safety unit 104 is assigned and/or dispatched to a current incident, as indicated by a record 116, and the like, and/or details there. For example, a CAD status of the public-safety unit 104 may indicate whether the public-safety unit 104 is dispatched to a current incident and/or "en-route" or "on-scene", or not dispatched to a current incident and/or "on-patrol". While on-route, a location 112 provided by a device 110 having the highest cadence may be selected as the primary location 112 and, when on-scene, a most accurate location 112 may be selected as the primary location 112.

Another context may comprise a CAD status of one or more of the responders 106, for example whether or not a responder 106 is dispatched to a current incident and/or whether or not a responder 106 is on-scene (e.g., located) at the current incident, and/or whether nor not a responder 106 has a weapon drawn, and the like. Such a CAD status may be indicated by information in the records 116 and/or one or more of the locations 112-1, 112-2, 112-3, and/or sensor data and/or event data from sensors of the public-safety unit 104, and the like. In a particular example, a location 112 associated with a responder 106 who may be in the most danger (e.g. as indicated by vest-pierce event and/or a weapon drawn event) may be selected as the primary location 112.

Another context may comprise a CAD status of the vehicle 108, for example whether or not the vehicle 108 is dispatched to a current incident and/or whether or not the vehicle 108 is en-route, on-scene, or on-patrol, and/or whether nor not the vehicle 108 has doors open or closed, and/or is stopped or moving, and the like. Such a CAD status may be indicated by information in the records 116 and/or the location 112-4 (e.g., as it changes over time) and/or telemetry data from a telemetry device of the vehicle 108, and the like. Similar to as described above, while the vehicle 108 is on-route, a location 112 provided by a device 110 having the highest cadence may be selected as the primary location 112 and, when the vehicle 108 is on-scene, a most accurate location 112 may be selected as the primary location 112.

> Sensor data received from one or more of: the plurality of devices 110; and other devices (e.g., such as sensors) associated with the public-safety unit 104, as described above. Hence, one or more contexts may comprise such sensor data. Similar to as described above, a location 112 associated with a responder 106 who may be in the most danger (e.g. as indicated by vest-pierce event and/or a weapon drawn event indicated by the sensor data) may be selected as the primary location 112.

> Event data received from one or more of: the plurality of devices 110; and other devices (e.g., such as sensors) associated with the public-safety unit 104, as described above. Hence, one or more contexts may comprise such event data. Similar to as described above, a location 112 associated with a responder 106 who may be in the most danger (e.g. as indicated by vest-pierce event and/or a weapon drawn event indicated by the event data) may be selected as the primary location 112.

> Respective associations between the plurality of devices 110 and the one or more public-safety personnel (e.g., the responders 106). For example, one of the responders 106 may be higher ranked than another responder 106, and associations between the plurality of devices 110 and the responders 106 may hence indicate a similar relative hierarchy of the devices 110. Hence, one or more contexts may a priority of a responder 106 and/or an associated device 110 from which a respective location 112 is received. Similar to as described above, a location 112 of a higher ranked responder 106 may be selected as the primary location 112.

However, the examples provided above of which location 112 is selected as the primary location 112 depending on context are merely a few possibilities and other possibilities are within the scope of the present specification.

Hence, in some of these examples, context associated with the public-safety unit 104 may be at least partially determined for a particular device 110 and/or a particular responder 106, and/or on a by-location basis (e.g., a context of a current incident may be associated with all the locations 112, while a context of event data may be associated with one of the locations 112 and/or an associated device 110 and/or an associated responder 106). In some of these examples, each of the locations 112 may be assigned a numerical context score (e.g., from 1 to 10) such that contexts of the locations 112 may be compared to each other.

In some examples, at the block 304, the controller 218 may determine a plurality of contexts associated with the public-safety unit 104, and determining the context associated with the public-safety unit 104 may comprise applying respective weights to the plurality of contexts. For example, a context indicating whether or not a weapon-drawn event and/or a vest piercing event has occurred may be assigned a relatively higher weight than a type of a current incident, which may be assigned a relatively higher weight than a geographic area of the current incident.

For example, in some of these examples, a context indicating whether or not a weapon-drawn event and/or a vest piercing event has occurred may be assigned a weight of 70%, a type of a current incident may be assigned a weight of 25%, and a geographic area of the current incident may be assigned a weight of 5%. Indeed, in such examples, when respective contexts of the locations 112 are assigned numerical scores, for example on a scale from 1 to 10, a numerical weighted score indicating respective context may be determined for each location 112.

However, in examples where machine learning is used, a context and/or a weighted context, may be determined based on machine learning algorithms and/or classifiers may be used to select a primary location 112 using the various contexts as input, as is next described.

At a block 306, the controller 218 and/or the computing device 102 selects a single location 112, from the plurality of locations 112, that represents a primary location 112 of the public-safety unit 104 based on the context as determined.

In examples where a numerical context and/or a numerical weighted score indicating respective context is determined for each location 112, the location 112 having the highest score may be selected as the primary location 112.

In examples where machine learning is used classifiers may be used to select a primary location 112 using the various contexts as input.

While some particular examples of selecting a primary location 112 based on context have been described above, any suitable context may be used to select a primary location 112. For example, when an address of a current incident comprises a known address of a dangerous suspect, and the like, a location 112, of the plurality of locations 112, closest to the known address, may be selected as the primary location 112.

Similarly, the public-safety unit 104 may be dispatched to an incident at a mall; while the vehicle 108 is moving, the primary location 112 may be selected as a location 112 having the highest accuracy and/or the highest cadence. However, when the vehicle 108 is determined to be stopped at the mall, the primary location 112 may be selected as a location 112 reported by a device 110 carried by one of the first responders 106, including, but not limited, a device 110 carried by the first responder 106 having the highest rank, a device 110 carried by the first responder 106 moving the fastest (e.g., as determined from multiple respective locations 112 received from the devices 110), and the like. Such examples further illustrate that the primary location 112 of the public-safety unit 104 may change over time.

In another specific example where the primary location 112 of the public-safety unit 104 changes, the device 110-1 associated with the responder 106-1 may be ranked highest according to a determined score, as described above, and hence an associated location 112-1 may initially be selected as a primary location 112 for the public-safety unit 104. However, later, a vest pierce event may be detected for responder 106-2 (e.g. using associated sensors), and the primary location 112 for the public-safety unit 104 may change to the associated location 112-3 of the responder 106-2.

In yet another example, a context of the public-safety unit 104 may comprise the public-safety unit 104 being dispatched to a current incident that is classified as dangerous, and/or a context of the public-safety unit 104 may comprise the public-safety unit 104 being dispatched to geographic area having a high crime rate and/or classified as dangerous. In such examples, the primary location 112 may be selected based on which of the devices 110 has the highest cadence, so that the primary location 112 comprises a current location of the public-safety unit 104 that is reported most often by the devices 110, regardless of accuracy.

In yet another example, a context of the public-safety unit 104 may comprise the public-safety unit 104 being dispatched to a current incident and initially being "en-route" to the current incident (e.g., as indicated by a CAD status), and later being "on-scene" at the current incident. In such examples, the primary location 112 may be initially selected, for example while the public-safety unit 104 is "en-route" based on which of the devices 110 has the highest cadence for reporting respective locations 112. Later, when the public-safety unit 104 is "on-scene", the primary location 112 may change to a location 112 having the highest accuracy. However, such a change may, or may not occur, depending on an incident type; for example, accuracy of a location 112 may be less important for incident types not classified as dangerous (e.g., such as noise complaints), and more important for incident types classified as dangerous (e.g., such a robbery).

As mentioned previously, cadence and/or accuracy may also depend on a type of location reporting device of a device 110. Hence, selection of a location 112 as a primary location 112 may additionally or alternatively depend on a type of location reporting device of a device 110.

Hence, such examples further indicate that selecting a single location 112, at the block 306, may be based on the context determined at the block 304, and further based on one or more of: respective accuracy of the plurality of locations 112 received from the plurality of devices 110; respective cadence location reporting of the plurality of devices 110; respective types of location-determining devices that determined respective locations 112 at the plurality of devices 110; and the like.

However, selecting a single location 112, at the block 306, may be based on the context determined at the block 304 and any other suitable factors including, but not limited to, capabilities of the devices 110 such as respective processing capabilities, respective antenna characteristics, respective communications paths. For example, locations 112 reported by devices 110 having relatively faster processing and/or relatively better antenna characteristics and/or relatively faster communications paths (e.g. as determined by a network that a device 110 uses to report a location 112) may be prioritized for being selection as the primary location 112 over locations 112 reported by devices 110 having relatively slower processing and/or relatively poorer antenna characteristics and/or relatively slower communications paths (e.g. as determined by a network that a device 110 uses to report a location 112). In particular, locations 112 reported by devices 110 having relatively faster processing and/or relatively better antenna characteristics and/or relatively faster communications paths may be more accurate, and/or reported more frequently, and the like, over locations 112 reported by devices 110 having relatively slower processing and/or relatively poorer antenna characteristics and/or relatively slower communications paths.

In yet further examples, selecting a single location 112, at the block 306, may be based on the context determined at the block 304 and further based on network coverage; for example, one device 110 may have better network coverage than another device 110 (e.g., due a narrowband network having better, or worse, available bandwidth than a broadband network, and the like, and/or GPS satellite coverage being better than assisted GPS coverage). In such examples, a location 112 reported by a device 110 having better network coverage may be selected as the primary location 112.

The controller 218 and/or the computing device 102 may then perform one or more of block 308 and/or a block 310.

At a block 308, the controller 218 and/or the computing device 102 causes the primary location 112 to be provided at an electronic map 122. For example, as has already been described, the controller 218 and/or the computing device 102 may cause the primary location 112 to be provided at an electronic map 122 by transmitting the primary location 112 to the CAD device 118 (and/or a public-safety server), which renders the primary location 112 at the electronic map 122-1.

In some of these examples, the controller 218 and/or the computing device 102 causes the primary location 112 to be provided at an electronic map 122 by providing the plurality of locations 112 to one or more of the CAD device 118 and the public-safety server, with an indication of the primary location 112, such that one or more of the CAD device 118 and the public-safety server renders the primary location 112 at the electronic map 122-1.

In some of these examples, the controller 218 and/or the computing device 102 causes the primary location 112 to be provided at an electronic map 122 by providing the plurality of locations 112 to one or more of the CAD device and the public-safety server, such that one or more of the CAD device 118 and the public-safety server provides at least the primary location 112 to one or more further public-safety units 120 that renders the primary location 112 at respective electronic maps 122-2.

In yet further examples, the controller 218 and/or the computing device 102 causes the primary location 112 to be provided at an electronic map 122 by causing rendering of the primary location 112 at an electronic map 122 with one or more other locations 112 (e.g., secondary locations) of the plurality of locations 112, the primary location 112 rendered differently from the other locations 112. For example, the locations 112 may be rendered as respective icons and/or dots, with an icon and/or dot representing the primary location 112 being different from and/or larger than, and the like, icon and/or dots representing the other/secondary locations 112. For example, and/or in addition to small and large icons, and the like, the locations 112 may be rendered as respective icons, with respective icons of the other/secondary locations 112 being ghosted (e.g., opaque) and an icon representing the primary location 112 being solid and/or not ghosted, among other possibilities.

In yet further examples, the plurality of locations 112 may be rendered at an electronic map 122, with the primary location 112 rendered differently from the other locations 112, but all the locations circled, and the like, which may show a geographic "spread" of the locations 112.

In yet further examples, described in more detail below with respect to FIG. 5, the controller 218 and/or the computing device 102 causes the primary location 112 to be provided at an electronic map 122 by causing rendering of the primary location 112 at an electronic map 122 with selectable electronic options associated with one or more other locations 112 of the plurality of locations 112 such that, in response to a given electronic option being selected via an input device, an associated other location 112 is rendered at the electronic map 122 with the primary location 112. In some of these examples, the selectable electronic options may be hidden at the electronic map 122 until the primary location 112 at the electronic map 122 is selected via the input device.

At a block 310, the controller 218 and/or the computing device 102 provides the primary location 112 to one or more of a CAD device 118 and a public-safety server, which may, or may not, render the primary location 112 at the electronic map 122-1, and/or may transmit the primary location 112 to a further public-safety unit 120, which may, or may not, render the primary location 112 at a respective electronic map 122-2 (e.g., at a respective display screen).

In some examples, providing the primary location 112 to one or more of the CAD device 118 and the public-safety server causes one or more of the CAD device 118 and the public-safety server to one or more of: dispatch one or more further public-safety units 120 to the primary location 112; and report the primary location 112 to the one or more further public-safety units 120. Such dispatching and/or reporting may occur with, or without, rendering of the primary location 112 at an electronic map 122, however such dispatching and/or reporting may enable a further public-safety unit 120 to travel to the primary location 112 to provide assistance to the public-safety unit 104.

In further examples, providing the primary location 112 to one or more of the CAD device 118 and the public-safety server may cause one or more of the CAD device 118 and the public-safety server to identify a camera at the primary location 112. For example, the CAD device 118 and the public-safety server may have access to a list (e.g., which may be stored at the memory 114) of cameras (e.g., closed network security cameras and/or public-safety cameras) and locations thereof, which may be compared to the primary location 112. A camera feed of a camera at the primary location 112 may be accessed to view the primary location 112 to determine whether, or not the public-safety unit 104 and/or a responder 106, may need assistance.

Figure 4:
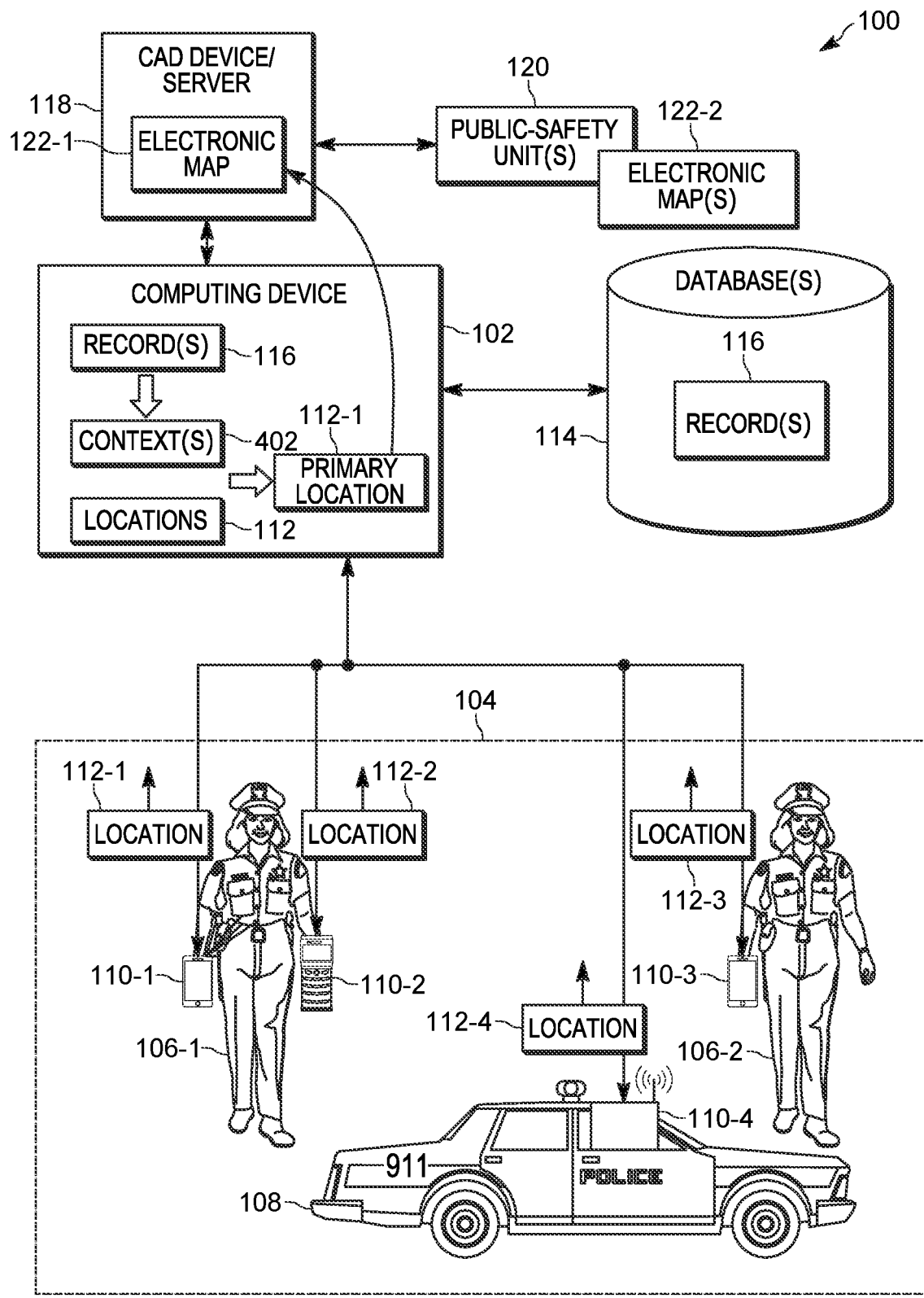
FIG. 4 depicts the system of FIG. 1 implementing a method for determining a primary location of a public-safety unit, in accordance with some examples.

Attention is next directed to FIG. 4, which depicts an example of the process 300. FIG. 4 is substantially similar to FIG. 1, with like components having like numbers.

In FIG. 4, the computing device 102 is receiving the locations 112 (e.g., at the block 302 of the process 300). In FIG. 4, the computing device 102 further determines (e.g., at the block 304 of the process 300) one or more contexts 402, for example from the records 116 and/or other information described above, and selects (e.g., at the block 304 of the process 300) the location 112-1, from the locations 112, as the primary location 112.

For example, the public-safety unit 104 may be dispatched to an incident at a mall, the vehicle 108 may be stopped, the responder 106-1, associated with the devices 110-1, 110-2 reporting the respective locations 112-1, 112-2, may be moving faster than the responder 106-2, and the device 110-1 may have a higher cadence than the device 110-2. However, as has been described herein, any suitable context may be determined and used to select any suitable location 112 as the primary location.

As depicted, the computing device 102 provides (e.g., at the block 310 of the process 300) the primary location 112-1, to the CAD device 118, which renders the primary location 112-1 at the electronic map 122-1, thereby causing (e.g., at the block 308 of the process 300) the primary location 112-1 to be provided at an electronic map 122. The other locations 112 may also be provided to the CAD device 118 and rendered, with the primary location 112-1, at the electronic map 122-1. Alternatively, the primary location 112-1 (e.g., with, or without, the other locations 112), may be provided to devices of the further public-safety units 120, and rendered at a respective electronic map 122-2.

Figure 5:
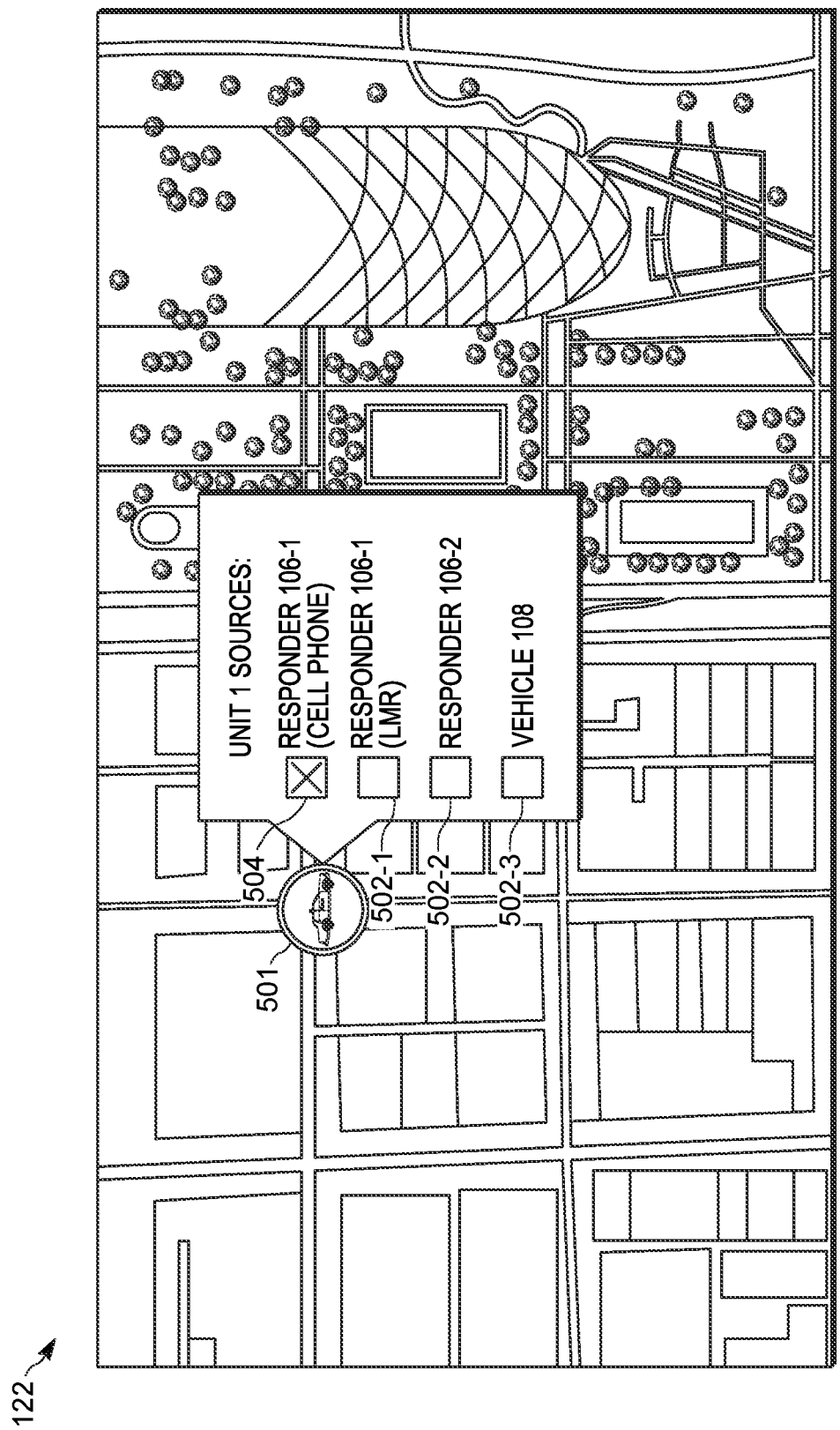
FIG. 5 depicts an example of providing a primary location of a public-safety unit at an electronic map with options for providing secondary locations of the public-safety unit, in accordance with some examples.
Figure 6:
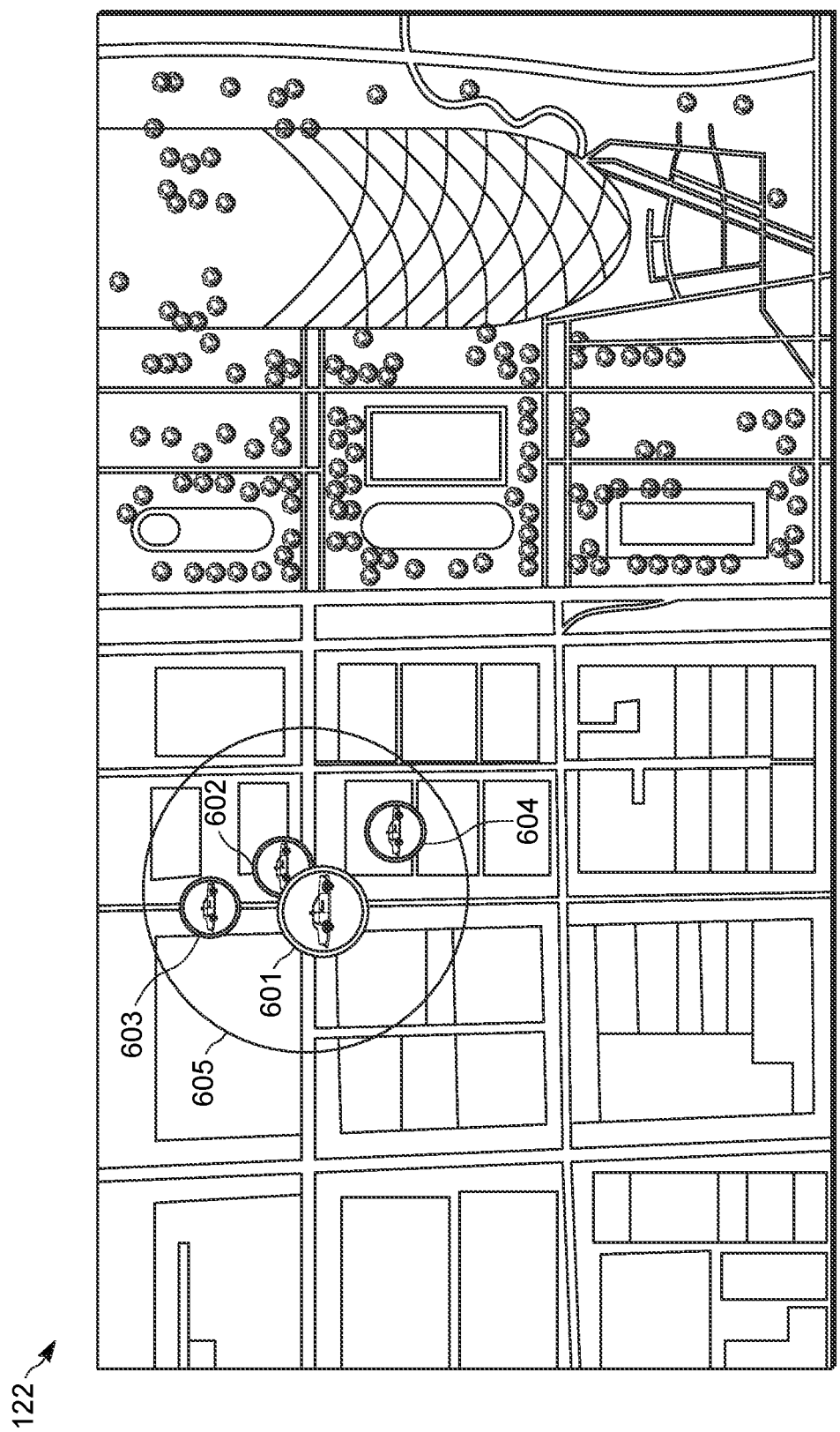
FIG. 6 depicts another example of providing a primary location of a public-safety unit at an electronic map, in accordance with some examples.

Attention is next directed to FIG. 5 and FIG. 6, which depict respective examples of providing a primary location 112 at an electronic map 122.

At FIG. 5, an electronic map 122 is depicted with a primary location 112 indicated via an icon 501 indicating the primary location 112. As depicted, the icon 501 comprises a "dot" with a graphic of a vehicle on the dot indicating the public-safety unit 104 includes a vehicle.

Continuing with the example where the primary location 112 comprises the location 112-1, the icon 501 may be provided at the location 112-1. As depicted, the other locations 112-2, 112-3, 112-4 are not shown; however, in this example, the icon 501 at the primary location 112-1 is provided with selectable electronic options 502-1, 502-2, 502-3 (e.g., the options 502 and/or an option 502) respectively associated with one or more other/secondary locations 112-2, 112-3, 112-4. For example, the selectable option 502-1 is associated with a location 112-2 of the device 110-2 (e.g., an LMR device) of the responder 106-1, as the associated depicted text indicates. Similarly, the selectable option 502-2 is associated with a location 112-3 of the responder 106-2 and/or the associated device 110-3, as the associated depicted text indicates. Similarly, the selectable option 502-3 is associated with a location 112-4 of the vehicle 108 and/or the associated device 110-4, as the associated depicted text indicates.

When a given electronic option 502 is selected, for example via an input device at the CAD device 118 and/or a device of a further public-safety unit 104, an associated other location 112 is rendered at the electronic map 122 with the primary location 112-1. Hence, for example: to render the location 112-2 at the electronic map 122, the option 502-1 may be selected; to render the location 112-3 at the electronic map 122, the option 502-2 may be selected; and to render the location 112-4 at the electronic map 122, the option 502-3 may be selected. Respective locations 112-2, 112-3, 112-4 may stop being rendered when a respective option 502 is de-selected, and the like. As depicted, however, none of the options 502 are selected (e.g., selection may be indicated via an "X" in associated "square" of an option 502 and/or in any other suitable manner).

As depicted, the electronic map 122 is also rendered with an electronic option 504 associated with the primary location 112-1 of the device 110-1 (e.g., a cell phone) of the responder 106-1, which, as depicted, is selected, but may be deselected to stop rendering of the primary location 112-1 at the electronic map 122.

Furthermore, the options 502, 504 may be provided when the icon 501 is selected via the input device. When all the options 502, 504 are deselected, such that no locations 112 are shown at the electronic map, the options 502, 504 may be provided via navigation of a menu system, and the like, associated with the electronic map 122.

Such examples assume that device performing the rendering of the electronic map 122 (e.g., the CAD device 118 and/or a device of a further public-safety unit 120) is generally configured to implement such functionality.

Attention is next directed to FIG. 6, which depicts an electronic map 122 with a primary location 112 indicated via an icon 601 (e.g., a "dot") indicating the primary location 112-1 and icons 602, 603, 604, respectively indicating secondary locations 112-2, 112-3, 112-4. In particular, the electronic map 122 of FIG. 6 may be similar to the electronic map 122 of FIG. 5 after all the options 502, 504 are selected. As depicted, the icon 601 is larger than the icons 602, 603, 604 as the icon 601 represents the primary location 112-1. As depicted, a circle 605 surrounds the icons 601, 602, 603, 604 to show a general area on the electronic map 122 at which the public-safety unit 104 is located. Furthermore, while each of the icons 601, 602, 603, 604 includes a graphic of a vehicle, to indicate that the public-safety unit 104 includes a vehicle, in other examples, each of the icons 601, 602, 603, 604 may include a graphic indicating a respective device 110 that reported an associated location 112. For example, the icons 601, 603 may include a graphic of a cell phone, the icon 602 may include a graphic of an LMR device, and the icon 604 may include a graphic of a vehicle.

It is further understood that, in some examples, the electronic maps 122 may be provided with the context used to select a primary location 112, which may be rendered, for example as text and/or graphics, and the like, the electronic maps 122. For example, when a context that lead to a given location 112 being selected as a primary location 112 includes a detected "man-down" event, an electronic map 122 may indicate the primary location 112 with text and/or a graphic indicating a "man-down" at the primary location 112, among other possibilities. Similarly, when a primary location 112 is selected due to a CAD status being "en-route", "on-scene" or "on-patrol", text and/or a graphic indicating the CAD status may be provided indicating such; hence, when a primary location 112 changes (e.g., from "en-route" to "on-scene"), a viewer of the electronic map 122 may understand the context that lead to the change. In such examples, when a primary location 112 changes due to any suitable context change, text and/or graphics, and the like, indicating the context and/or context change may be provided.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and/or a human mind cannot determine a primary location of a public-safety unit based on context, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at a computing device, from a plurality of devices associated with a public-safety unit, a plurality of locations associated with the public-safety unit, the public-safety unit comprising the plurality of devices and one or more public-safety personnel;
determining, at the computing device, a context associated with the public-safety unit;
selecting, at the computing device, a single location, from the plurality of locations, that represents a primary location of the public-safety unit based on the context as determined; and, one or more of:
causing, via the computing device, the primary location to be provided at an electronic map; and
providing, from the computing device, the primary location to one or more of a computer-aided dispatch (CAD) device and a public-safety server,
wherein a plurality of contexts associated with the public-safety unit are determined, and determining the context associated with the public-safety unit comprises applying respective weights to the plurality of contexts.

2. The method of claim 1, wherein the context is determined from one or more of:
a current incident to which the public-safety unit is dispatched;
an incident type of the current incident;
a respective geographic area of the current incident;
a respective address of the current incident;
a respective CAD status of one or more of: the public-safety unit; the one or more public-safety personnel of the public-safety unit; and a vehicle of the public-safety unit;

telemetry data of the vehicle;
sensor data received from one or more of: the plurality of devices; and other devices associated with the public-safety unit;
event data received from one or more of: the plurality of devices; and the other devices associated with the public-safety unit; and
respective associations between the plurality of devices and the one or more public-safety personnel.

3. The method of claim 1, wherein selecting the single location is based on the context and further based on one or more of:
respective accuracy of the plurality of locations received from the plurality of devices;
respective types of location-determining devices that determined respective locations at the plurality of devices; and
respective cadence location reporting of the plurality of devices.

4. The method of claim 1, wherein causing the primary location to be provided at the electronic map comprises:
causing rendering of the primary location at the electronic map with one or more other locations of the plurality of locations, the primary location rendered differently from the other locations.

5. The method of claim 1, wherein causing the primary location to be provided at the electronic map comprises:
causing rendering of the primary location at the electronic map with selectable electronic options associated with one or more other locations of the plurality of locations such that, in response to a given electronic option being selected via an input device, an associated other location is rendered at the electronic map with the primary location.

6. The method of claim 5, wherein the selectable electronic options are hidden at the electronic map until the primary location at the electronic map is selected via the input device.

7. The method of claim 1, wherein causing, the primary location to be provided at the electronic map comprises:
providing the plurality of locations to one or more of the CAD device and the public-safety server, with an indication of the primary location, such that one or more of the CAD device and the public-safety server renders the primary location at the electronic map.

8. The method of claim 1, wherein causing, the primary location to be provided at the electronic map comprises:
providing the plurality of locations to one or more of the CAD device and the public-safety server, with an indication of the primary location, such that one or more of the CAD device and the public-safety server provides at least the primary location to one or more further public-safety units that render the primary location at respective electronic maps.

9. The method of claim 1, wherein providing the primary location to one or more of the CAD device and the public-safety server causes one or more of the CAD device and the public-safety server to one or more of:
dispatch one or more further public-safety units to the primary location;
report the primary location to the one or more further public-safety units; and
identify a camera at the primary location.

10. A device comprising:
a communication unit; and
a controller communicatively coupled to the communication unit, the controller configured to:

receive, via the communication unit, from a plurality of devices associated with a public-safety unit, a plurality of locations associated with the public-safety unit, the public-safety unit comprising the plurality of devices and one or more public-safety personnel;
determine a plurality of contexts associated with the public-safety unit
determine a context associated with the public-safety unit by applying respective weights to the plurality of contexts;
select a single location, from the plurality of locations, that represents a primary location of the public-safety unit based on the context as determined; and, one or more of:
cause the primary location to be provided at an electronic map; and
provide, via the communication unit, the primary location to one or more of a computer-aided dispatch (CAD) device and a public-safety server.

11. The device of claim 10, wherein the controller is further configured to determine the context from one or more of:
a current incident to which the public-safety unit is dispatched;
an incident type of the current incident;
a respective geographic area of the current incident;
a respective address of the current incident;
a respective CAD status of one or more of: the public-safety unit; the one or more public-safety personnel of the public-safety unit; and a vehicle of the public-safety unit;
telemetry data of the vehicle;
sensor data received from one or more of: the plurality of devices; and other devices associated with the public-safety unit;
event data received from one or more of: the plurality of devices; and the other devices associated with the public-safety unit; and
respective associations between the plurality of devices and the one or more public-safety personnel.

12. The device of claim 10, wherein the controller is further configured to select the single location based on the context and on one or more of:
respective accuracy of the plurality of locations received from the plurality of devices;
respective types of location-determining devices that determined respective locations at the plurality of devices; and
respective cadence location reporting of the plurality of devices.

13. The device of claim 10, wherein the controller is further configured to cause the primary location to be provided at the electronic map by:
causing rendering of the primary location at the electronic map with one or more other locations of the plurality of locations, the primary location rendered differently from the other locations.

14. The device of claim 10, wherein the controller is further configured to cause the primary location to be provided at the electronic map by:
causing rendering of the primary location at the electronic map with selectable electronic options associated with one or more other locations of the plurality of locations such that, in response to a given electronic option being selected via an input device, an associated other location is rendered at the electronic map with the primary location.

15. The device of claim 14, wherein the selectable electronic options are hidden at the electronic map until the primary location at the electronic map is selected via the input device.

16. The device of claim 10, wherein the controller is further configured to cause the primary location to be provided at the electronic map by:
providing the plurality of locations to one or more of the CAD device and the public-safety server, with an indication of the primary location, such that one or more of the CAD device and the public-safety server renders the primary location at the electronic map.

17. The device of claim 10, wherein the controller is further configured to cause the primary location to be provided at the electronic map by:
providing the plurality of locations to one or more of the CAD device and the public-safety server, with an indication of the primary location, such that one or more of the CAD device and the public-safety server provides at least the primary location to one or more further public-safety units that render the primary location at respective electronic maps.

18. The device of claim 10, wherein the controller providing the primary location to one or more of the CAD device and the public-safety server causes one or more of the CAD device and the public-safety server to one or more of:
dispatch one or more further public-safety units to the primary location;
report the primary location to the one or more further public-safety units; and
identify a camera at the primary location.

19. A method comprising:
receiving, at a computing device, from a plurality of devices associated with a public-safety unit, a plurality of locations associated with the public-safety unit, the public-safety unit comprising the plurality of devices and one or more public-safety personnel;
determining, at the computing device, a context associated with the public-safety unit;
selecting, at the computing device, a single location, from the plurality of locations, that represents a primary location of the public-safety unit based on the context as determined; and
causing, via the computing device, the primary location to be provided at an electronic map by one or more of:
providing, from the computing device, the primary location to one or more of a computer-aided dispatch (CAD) device and a public-safety server
causing rendering of the primary location at the electronic map with selectable electronic options associated with one or more other locations of the plurality of locations such that, in response to a given electronic option being selected via an input device, an associated other location is rendered at the electronic map with the primary location;
causing rendering of the primary location at the electronic map with the selectable electronic options associated with the one or more other locations of the plurality of locations such that, in response to the given electronic option being selected via the input device, the associated other location is rendered at the electronic map with the primary location, wherein the selectable electronic options are hidden at the electronic map until the primary location at the electronic map is selected via the input device;
providing the plurality of locations to one or more of the CAD device and the public-safety server, with an indication of the primary location, such that one or more of the CAD device and the public-safety server renders the primary location at the electronic map; and
providing the plurality of locations to one or more of the CAD device and the public-safety server, with the indication of the primary location, such that one or more of the CAD device and the public-safety server provides at least the primary location to one or more further public-safety units that render the primary location at respective electronic maps.

20. A method comprising:
receiving, at a computing device, from a plurality of devices associated with a public-safety unit, a plurality of locations associated with the public-safety unit, the public-safety unit comprising the plurality of devices and one or more public-safety personnel;
determining, at the computing device, a context associated with the public-safety unit;
selecting, at the computing device, a single location, from the plurality of locations, that represents a primary location of the public-safety unit based on the context as determined; and
providing, from the computing device, the primary location to one or more of a computer-aided dispatch (CAD) device and a public-safety server,
wherein providing the primary location to one or more of the CAD device and the public-safety server causes one or more of the CAD device and the public-safety server to one or more of:
dispatch one or more further public-safety units to the primary location;
report the primary location to the one or more further public-safety units; and
identify a camera at the primary location.

* * * * *